UNITED STATES PATENT OFFICE.

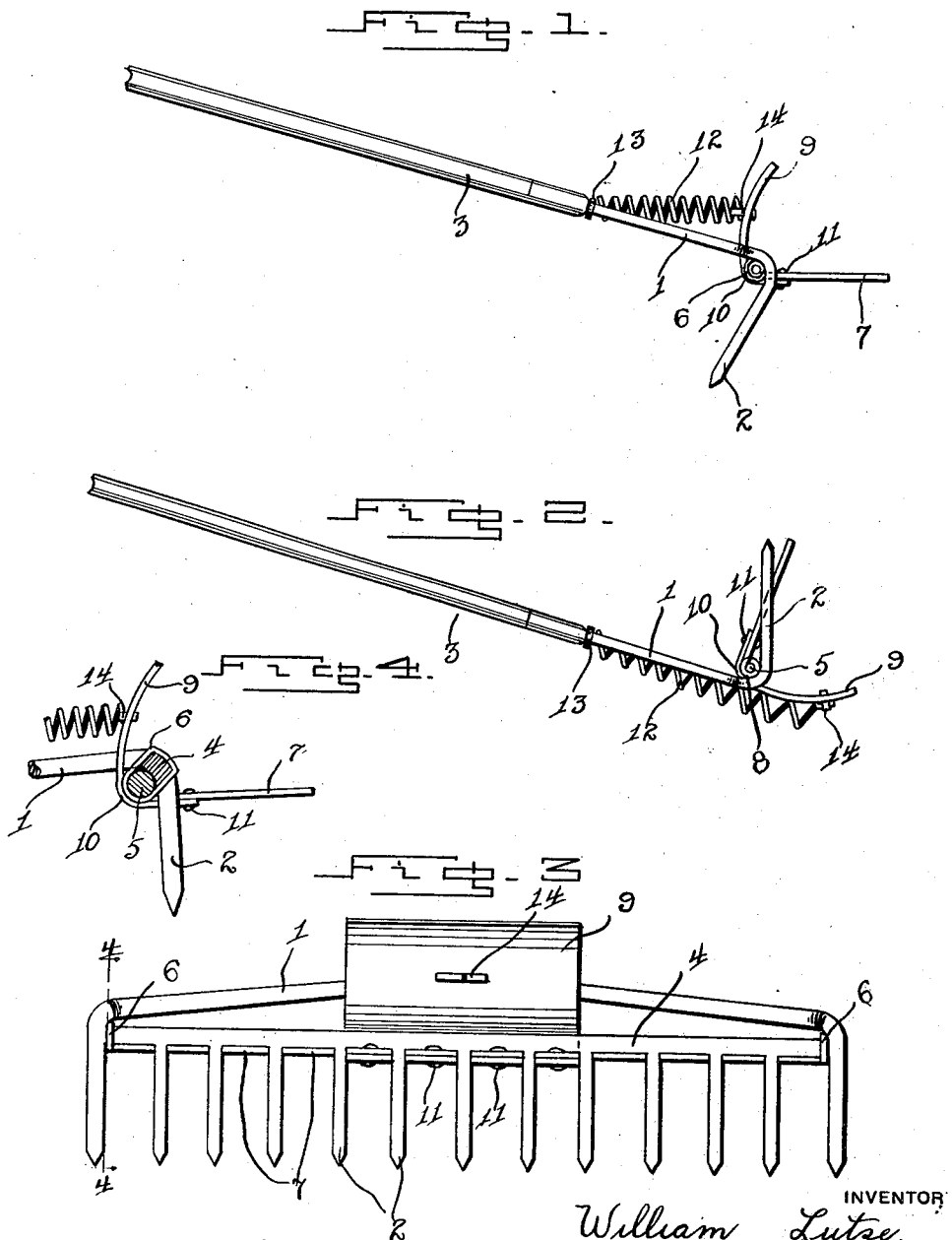

WILIAM LUTZE, OF HOLYOKE, COLORADO.

RAKE.

1,217,322.  Specification of Letters Patent.  Patented Feb. 27, 1917.

Application filed October 27, 1915. Serial No. 58,186.

*To all whom it may concern:*

Be it known that I, WILIAM LUTZE, a citizen of the United States, residing at Holyoke, in the county of Phillips and State of Colorado, have invented certain new and useful Improvements in Rakes, of which the following is a specification.

My invention relates to rakes and more particularly to means for cleaning the teeth thereof.

The primary object of my invention is to provide a tooth cleaner for rakes which is readily applicable for use on any of the types of rakes now in use and one which is simple in construction, cheap to manufacture, and strong and durable.

Another object of the invention is to provide a rake tooth cleaner which will quickly and easily clean the teeth of a rake, the invention being operated by inverting the rake and imparting a reciprocatory movement thereto.

With the above and other objects in view my invention resides preferably in the construction, combination and arrangement of parts as hereinafter set forth in the specification and illustrated in the accompanying drawings, in which, Figure 1 is a side elevation of a rake showing my improved rake cleaner attached thereto.

Fig. 2 is a similar view of the rake inverted showing my invention in operating position.

Fig. 3 is a front elevational view of a rake having my invention applied thereto, and Fig. 4 is a sectional view taken on the line 4—4 of Fig. 3 looking in the direction of the arrow.

Similar reference characters designate similar parts throughout the various views of the drawings.

In the drawings, I have illustrated a rake having the usual rake frame 1, provided with a plurality of teeth 2, said frame 1 having the usual handle 3 extending therefrom. The tooth bar is designated 4 and in the type of rake shown the frame 1, the tooth bar 4 and teeth 2 are all cast in an integral structure. However, my invention is applicable to various types of rakes.

My invention comprises a shaft 5 detachably carried by the tooth bar 4, a plurality of suitable straps or the like 6 embracing said shaft and said tooth bar whereby to retain said shaft in the position shown parallel to said tooth bar. The shaft 5 carries a plurality of oscillatable cleaning fingers 7 formed of sheet metal or the like extending between said rake teeth 2. The cleaning fingers 7 are preferably formed from a single blank of metal, said blank being rolled about the shaft 5, as indicated at 8.

In order to oscillate the fingers 7 I provide an actuating member comprising an arm 9 formed of sheet metal slightly arcuate in cross section having one marginal edge thereof bent at right angles, as indicated at 10, and riveted or otherwise secured, as at 11, to certain of the fingers 7. The fingers are maintained in inoperative position by means of a coil spring or the like 12 having one of its extremities connected to the handle 3, as indicated at 13, and the other extremity thereof connected to the arm 9, as indicated at 14.

When using the rake in the usual manner the cleaning fingers are in the position shown in Fig. 1 and do not in any way interfere with the manipulation of the rake. When the rake teeth become clogged the rake is simply inverted, as shown in Fig. 2. By moving the rake rearwardly along the ground the arm 9 will be caused to move into the position shown in Fig. 2 against the tension of the spring 12, moving said cleaning fingers 7 outwardly between the teeth 2. This movement will cause any matter held by the teeth to be removed quickly and easily therefrom. It will be noted that a particular advantage of this invention resides in the fact that no complicated levers or similar mechanism are necessary, but the rake is merely operated in the usual manner, being inverted to clean the teeth.

From the above description taken in connection with the accompanying drawings it is thought that a clear and comprehensive understanding of the construction, operation and advantages of my invention may be readily gathered, and while I have shown and described the same as embodying a specific structure I desire that it be understood that I may make such changes therein which do not depart from the spirit and scope of the invention as claimed.

I claim:—

In combination with a rake, a cleaner therefor including a bar pivotally and detachably carried by the rake, a plurality of cleaning fingers arranged upon said bar and to clean the teeth of said rake, a right angularly extending operating arm carried by said bar, said operating arm adapted for engagement with the ground when the rake is inverted, and a coiled spring element connecting said arm with said rake to maintain the fingers normally in inoperative position.

In testimony whereof I affix my signature in presence of two witnesses.

WILIAM LUTZE.

Witnesses:
H. L. COHEN,
H. L. FUNKHOUSER.

Copies of this patent may be obtained for five cents each, by addressing the "Commissioner of Patents, Washington, D. C."